United States Patent [19]

Stendahl et al.

[11] Patent Number: 5,720,882
[45] Date of Patent: Feb. 24, 1998

[54] TREATMENT METHOD FOR WASTE WATER SLUDGE COMPRISING PHOSHOROUS, HEAVY METALS AND AT LEAST ONE METAL

[75] Inventors: Kjell Stendahl, Helsingborg, Sweden; Simo Jokinen, Oulu, Finland

[73] Assignee: Kemira Kemi AB, Helsingborg, Sweden

[21] Appl. No.: 601,054

[22] PCT Filed: Aug. 26, 1994

[86] PCT No.: PCT/FI94/00376

§ 371 Date: May 31, 1996

§ 102(e) Date: May 31, 1996

[87] PCT Pub. No.: WO95/06004

PCT Pub. Date: Mar. 2, 1995

[30] Foreign Application Priority Data

Aug. 26, 1993 [FI] Finland ................................. 933750

[51] Int. Cl.$^6$ ..................................................... B01D 11/02
[52] U.S. Cl. .......................... 210/638; 210/639; 210/702; 210/703; 210/722; 210/912
[58] Field of Search ............................. 210/634, 638, 210/639, 711, 722, 759, 906, 912, 713, 774, 806, 702, 703

[56] References Cited

U.S. PATENT DOCUMENTS

| | | | |
|---|---|---|---|
| 4,284,515 | 8/1981 | Liu | 210/724 |
| 4,343,706 | 8/1982 | Etzel | 210/711 |
| 4,348,228 | 9/1982 | Zarur | |
| 4,539,119 | 9/1985 | Cann | 210/711 |
| 4,566,975 | 1/1986 | Allgulin | 210/713 |
| 4,954,168 | 9/1990 | Crnojevich et al. | |
| 5,051,187 | 9/1991 | Matsumoto et al. | 210/639 |
| 5,102,556 | 4/1992 | Wong | 210/711 |
| 5,296,151 | 3/1994 | Muller et al. | 210/722 |

FOREIGN PATENT DOCUMENTS

| | | |
|---|---|---|
| 0 058 148 A2 | 8/1982 | European Pat. Off. . |
| 0 072 885 A1 | 3/1983 | European Pat. Off. . |
| 0 332 447 A1 | 9/1989 | European Pat. Off. . |
| 0 484 268 A1 | 5/1992 | European Pat. Off. . |
| 822490 | 12/1986 | Finland . |
| 3005635 A1 | 8/1981 | Germany . |
| 3301120 A1 | 7/1983 | Germany . |
| 4024769 C1 | 2/1992 | Germany . |
| 52-46303 | 4/1977 | Japan . |
| 94514 | 9/1988 | Romania . |
| 1 595 407 | 8/1981 | United Kingdom . |

OTHER PUBLICATIONS

Reinhardt, "Solvent extraction for recovery of metal waste," *Chemistry and Industry*, pp. 210-213, Mar. 1, 1975.

*Primary Examiner*—Joseph W. Drodge

[57] ABSTRACT

Waste water sludge which contains phosphorous, heavy metals and at least one metal originating from a waste water treatment coagulant, is treated in order to recover the phosphorous and the at least one metal, and to discharge the heavy metals. The at least one metal includes iron. The treatment method includes the steps of acidifying the sludge to dissolve metals contained therein; subjecting the acidified sludge to liquid-liquid extraction to thereby provide an aqueous phase or raffinate, and recovering at least a portion of the at least one metal; treating the raffinate, during a first precipitation stage, with an effective amount of chemicals to provide a precipitate including heavy metals, and a solution having a decreased content of heavy metals; discharging the precipitate including heavy metals; treating the solution having a decreased content of heavy metals, in a second precipitation stage, with an effective amount of chemicals to provide a precipitate including phosphorous; and recovering phosphorous from the precipitate including phosphorous.

37 Claims, 5 Drawing Sheets

TREATMENT METHOD FOR WASTE WATER SLUDGE COMPRISING PHOSHOROUS, HEAVY METALS AND AT LEAST ONE METAL

TECHNICAL FIELD

The invention relates to a method for treating waste water sludge comprising at least one metal, especially iron and possibly aluminium, originating from a waste water treatment coagulant, and phosphorus and heavy metals in order to recover said at least one metal and phosphorus and to discharge said heavy metals. In particular, the sludge is from a waste water purification process where waste water is chemically precipitated using coagulants containing iron and possibly aluminium.

BACKGROUND OF THE INVENTION

Disposal of waste water sludge is a major problem in water purification plants. This is partly due to the heavy metal content of the sludge. It is difficult to find suitable places for the waste and as standards rise landfilling is becoming more and more expensive. From this perspective the idea of recycling the waste water sludge is becoming increasingly important. A complete recycling of waste water sludge would involve recycling of coagulants (iron and aluminium), part of the organic substances of the sludge, recovery of phosphorus, and separation of the heavy metals from the sludge. Until now recycling of the sludge has been realized only partially. There are no existing production methods for separating coagulant chemicals and phosphorus from the sludge.

Sludge comes from various sources of the waste water purification process i.e. from pre-precipitation, simultaneous precipitation and post-precipitation stages. One possible treatment procedure for the sludge is first to dewater it to a dry solids content of 15–25% and then to use in agriculture, compost, incinerate or transport the dewatered sludge to a dump.

Another possible procedure is to acidify the precipitation sludge to dissolve metals. Insoluble substances are removed by filtering. The dissolved metals and phosphorus in the filtrate are precipitated and a sludge, which will be called a metal sludge, is obtained. The metal sludge contains the iron and aluminium of the used coagulant and, in addition, phosphorus and heavy metals. The procedure can also be performed at an elevated temperature to improve yield and filterability i.e. the dewatering properties of the sludge. The sludge to be treated can be a pre-precipitation sludge, a simultaneous precipitation sludge, post-precipitation sludge or a mixture thereof.

One additional alternative for treating the sludge is hydrolysis where the purpose is to hydrolyse organic material of the sludge into short-chained compounds to be utilized in later stages of the waste water treatment process, especially as carbon source in the denitrification stage. During hydrolysis, the metals of the raw sludge dissolve in the hydrolysate solution. In the so-called thermal acid hydrolysis the temperature is 150°–160° C. and pH<2 preferably 1–1.5. After the hydrolysis, the insoluble part i.e. the organic sludge is separated, the sludge containing mainly insoluble organic and partly inorganic material e.g. fibres and silicate minerals. The pH of the obtained solution is raised above the neutral level using a base so that the dissolved metals precipitate as hydroxides and phosphates. The precipitated sludge i.e. the metal sludge is then separated. The metal sludge contains iron and aluminium and also phosphorus and heavy metals.

Acidification nor hydrolysis of sludge is not commonly used in waste water purification. One reason is poor profitability. An additional problem is the metal sludge which has no use. The metal sludge contains heavy metals which makes the sludge a harmful waste for the environment.

The metal sludge can be dissolved in sulphuric acid or possibly in hydrochloric acid and the insoluble substances can be filtered. The acidic filtrate solution contains the coagulants, phosphorus and heavy metals. It cannot be recycled or utilized in any other way as such and there are no existing methods to separate the elements.

Solvent extraction i.e. liquid-liquid extraction is a well-known method for separating different elements from each other and, in principle, it could be used to separate said elements. However, there are difficulties in applying extraction to the acidified metal sludge of the above kind or to any other acidified waste water sludge. The acidic solution obtained by leaching waste water sludge with sulphuric acid not only contains dissolved metals but also insoluble fine solid particles, colloidal components, humic acids etc. These impurities comprise an undesirable organic residue (crud) which has the most unfavourable effect on extraction. It significantly retards mass transfer and phases disengagement. In disengagement of phases, after contacting the organic and aqueous phases, this substance usually collects as a separate layer between the phases. Therefore, the existence of the insoluble residue has prevented extraction methods from being exploited in the recovery of iron and aluminium from acidified sewage sludge.

Cornwell and Zoltek (J. Water Pollut. Control Fed., Vol 49, p. 600–612) have presented an extraction method for the recovery of aluminium from a sludge containing aluminium as aluminiumhydroxide. The extraction solvent is a mixture of monoethyl hexyl phosphate (MEHPA) and di-(2-ethyl hexyl) phosphate (DEHPA). A process employing solvent extraction with organic extractants for the removal of iron from aqueous acidic solutions has been suggested in the patent publication EP 58148. The objective of the method was to recover pure acid by extracting iron ions into organic solvent. Solvent extraction used for the selective recovery of dissolved iron and aluminium can, with a proper solvent, efficiently separate iron and aluminium from heavy metals.

SUMMARY OF THE INVENTION

The objective of this invention is to provide a method whereby the sludge problem in a waste water purification plant can be solved. The main objective is to provide a method whereby iron, aluminium and phosphorus of a metal sludge can be recovered. Iron and aluminium can be recycled in the purification process, phosphorus can be used e.g. as a fertilizer and, at the same time, the sludge containing the heavy metals can be separated and more easily disposed. This objective can be accomplished by the present invention, and thus the present invention provides a method for treating waste water sludge comprising at least one metal originating from a waste water treatment coagulant, and phosphorus and heavy metals in order to recover said at least one metal and phosphorus and to discharge said heavy metals, said method comprising:

acidifying said waste water sludge to dissolve metals contained in the sludge;

subjecting the acidified waste water sludge to liquid-liquid extraction for recovering at least a portion of said at least one metal;

treating the raffinate of the extraction in a first precipitation stage with appropriate chemicals for precipitating heavy metals, and thereafter discharging the precipitate thereby leaving a solution having a decreased content of heavy metals; and treating the solution having a decreased content of heavy metals in a second precipitation stage with appropriate chemicals for precipitating phosphorus and thereafter recovering the precipitated phosphorus.

Preferably the waste water sludge to be treated with the method of the present invention comprises metal sludge obtained by subjecting waste water sludge from a waste water treatment plant to acid treatment followed by precipitation of metal sludge from the filtrate.

DETAILED DESCRIPTION OF THE INVENTION

The method of the invention is a significant improvement compared to the conventional practice in the field and offers a sustainable solution for the utilization of waste water sludge. The invention renders utilization of the precipitated metal sludge possible. Phosphates and raw material for coagulant chemicals can be produced from the metal sludge. Furthermore, heavy metals can be separated whereby they do not harm the environment. The method improves profitability of sludge acidification or hydrolysis. In the method of the invention, Fe and Al are recovered as a solution which can be used in coagulation. Phosphorus is precipitated as calcium phosphate or magnesium ammonium phosphate, for example, which can be used in fertilizers.

Heavy metals of the metal sludge are separated by precipitation. The amount of the precipitated sludge containing heavy metals is small so that dumping of the sludge is easier and does not cause any harm to environment.

According to the invention the acidified sludge solution can be treated with an oxidizer like a strong solution of hydrogen peroxide prior to the liquid-liquid extraction stage to transform the organic substances of the sludge solution into such a form that does not have an unfavourable effect on the extraction and to oxidize the bivalent iron of the sludge solution into a trivalent iron. When hydrogen peroxide is added into a sludge with bivalent iron and organic compounds, a so-called Fenton-reagent is formed. This means that bivalent iron and hydrogen peroxide form hydroxyl radicals which function as very strong oxidizer being able to tackle the organic compounds with the desired effect. Other alternative oxidizers are oxygen, ozone, potassium permanganate, solution of potassium dichromate, chlorine, and chlorine dioxide. After this treatment the solution can be filtered and the filtrate solution is then taken to the liquid-liquid extraction stage.

According to the invention, it is also possible to remove organic material so that the waste water sludge is calcined before acidification at a temperature of 300° C. or over whereat organic material burns out. The calcination is to be performed in an atmosphere with an excess of oxygen. In this case oxidation is not needed.

The liquid-liquid extraction stage comprises an extraction stage and a stripping stage. In the extraction stage, said acidified waste water sludge is brought into contact with an extraction solution which is immiscible with water for forming an aqueous phase i.e. raffinate and an organic phase which organic phase contains ions of said metal. The raffinate is separated from the organic phase. In the stripping stage, the organic phase is brought into contact with an acidic aqueous stripping solution for forming an aqueous phase and an organic phase. The aqueous phase containing the desired metal ions is separated from the organic phase.

The extraction solution contains an organic phosphate, an organic solvent and possibly a long-chained alcohol. The organic phosphate is advantageously an alkyl phosphate like a monoalkyl phosphate e.g. a mono-(2-ethyl hexyl) phosphate (MEHPA), dialkyl phosphate e.g di-(2-ethyl hexyl) phosphate (DEHPA) or trialkyl phosphate e.g. tributyl phosphate, or a mixture thereof e.g. a mixture of MEHPA and DEHPA (MDEHPA). The organic solvent is advantageously a long-chained hydrocarbon solvent like kerosene. The long-chained alcohol can be 2-octanol, for example.

The stripping solution advantageously consists of hydrochloric acid or sulphuric acid. Stripping can also be performed in reducing conditions which can be accomplished by using a stripping solution containing sulphuric acid obtained by bubbling sulphur dioxide in water or dilute sulphuric acid.

According to the invention it is possible to subject the raffinate of the extraction prior to the first precipitation to a treatment with an alkali hydroxide for precipitating a further portion of iron and possibly aluminium as phosphates, and thereafter separating the phosphate precipitate. The alkali hydroxide, e.g. sodium hydroxide, is preferably added in an amount to raise the pH to a value between 2 and 4. The separated phosphate precipitate can be treated with an alkali hydroxide, e.g. sodium hydroxide, thereby forming insoluble iron hydroxide and a solution comprising soluble alkali phosphate and possibly aluminium hydroxide. Said solution can be introduced into the first or second precipitation stage.

According to the invention, the acidic raffinate is treated in the first precipitation stage with a heavy metal binder, like hydrogen sulphide or sulphide, e.g. sodium sulphide or sodium hydrogen sulphide or ferrous sulphide, at a suitable pH value for precipitating heavy metals and iron and at which pH aluminium can precipitate as a hydroxide or a phosphate. The precipitate is separated and the obtained aqueous solution is treated in a second precipitation stage with a reagent precipitating phosphorus, like calcium or magnesium oxide, calcium or magnesium hydroxide or calcium or magnesium chloride, at a suitable pH value for precipitating phosphorus as phosphates, like calcium or magnesium phosphate. In the presence of ammonia, the phosphorus can be precipitated specifically as $MgNH_4PO_4$ (MAP). This provides a means to remove ammonia from the solution. Part of the Mg used in this precipitation can also originate from the waste water sludge.

The method according to the invention can further comprise a third precipitation stage wherein aluminium is precipitated as aluminium hydroxide.

According to an advantageous embodiment the acidic raffinate is treated in the first precipitation stage with sodium sulphide adjusting the pH to a value within 5–8, using sodium hydroxide, MgO or $Mg(OH)_2$, or ammonia, for precipitating heavy metals and iron, which has come through the extraction stage, and possibly aluminium. The precipitate is separated and the aqueous solution obtained is treated in the second precipitation stage with a calcium or magnesium compound like calcium chloride, magnesium oxide, magnesium hydroxide or magnesium chloride possibly adjusting the pH value for precipitating calcium phosphate or magnesium ammonium phosphate, and the precipitate obtained is separated.

According to another advantageous embodiment of the invention, the acidic raffinate is treated in the first precipitation stage with a $S^{2-}$ or $HS^-$ containing reagent and, at the same time with the sulphide addition, raising the pH to a value of about 6–7, using a base like sodium hydroxide, for precipitating heavy metals and iron and possibly aluminium. Then the pH is adjusted to a value of over 9, preferably about 12 using sodium hydroxide, whereby the possibly precipitated aluminium is redissolved. The precipitate containing heavy metals is then separated. The aqueous solution containing phosphorus and aluminium is treated in the second precipitation stage with calcium chloride for precipitating calcium phosphate. The precipitate obtained is separated. The aqueous solution containing aluminium is treated in the third precipitation stage with an acidic compound like e.g. sulphuric acid for precipitating aluminium hydroxide and the precipitate obtained is separated.

A modification to the above embodiment, which is particularly suitable for removing possible Cr from the raffinate, is as follows. In the first precipitation stage, the pH of the acidic raffinate is adjusted to a value of about 3–4, using sodium hydroxide, and then the raffinate is treated with sodium sulphide for precipitating some of the heavy metals and iron residuals and possibly minor amounts of aluminium. The precipitate, which also contains Cr as chromium phosphate, is separated, after which pH is adjusted to a value of about 12 and over using sodium hydroxide. The precipitate possibly formed is separated. This precipitate contains also heavy metals. The aqueous solution containing Al and $PO_4$ is treated in the second precipitation stage with calcium chloride for precipitating calcium phosphate. The precipitate is separated and the aqueous solution obtained is treated in the third precipitation stage with sulphuric acid for precipitating aluminium hydroxide and the precipitate obtained is separated. The two precipitates containing heavy metals are united for disposal.

The method of the invention partly solves the sludge problem in a waste water purification plant by improving usability of the solid sludge of the waste water purification process. This is due to several factors. First, the amount of solid material decreases. There are less heavy metals in the sludge whereby it has better possibilities to be used in agricultural applications and incineration is safer. The calorific power of the dry solids is higher and the amount of remaining ash is lower. In addition, the heavy metal content of the ash is lower. Since the precipitated sludge which contains the heavy metals has a relatively small volume, it can be disposed of in a controlled manner without any harm to the environment.

DESCRIPTION OF THE DRAWING

The invention is described in more details in the following referring to the enclosed drawings in which.

Figure 1:
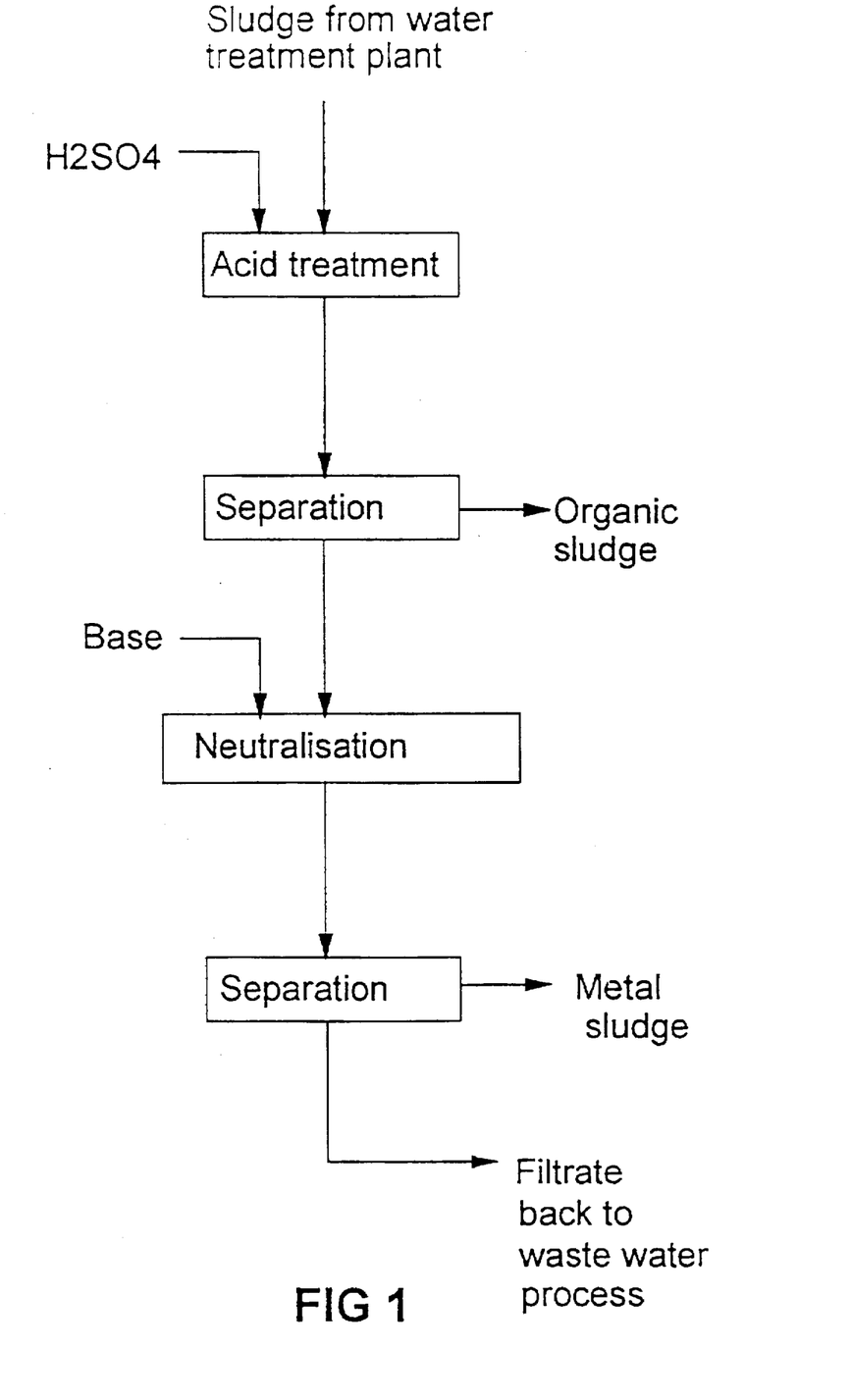
FIG. 1 shows an acidification process of precipitated sludge as a block diagram.

FIG. 1 shows diagrammatically processing of a sludge from a water treatment plant. The metals in the sludge dissolve in the solution during acidification. The insoluble part i.e. the organic sludge is separated, the organic sludge containing primarily fibres and possibly insoluble silicate minerals. For neutralizing the solution and precipitation of metals e.g. lime is added to the solution. In the separation stage subsequent to the neutralization stage, the metal sludge is separated. The filtrate is led to later stages of the waste water treatment process.

Figure 2:
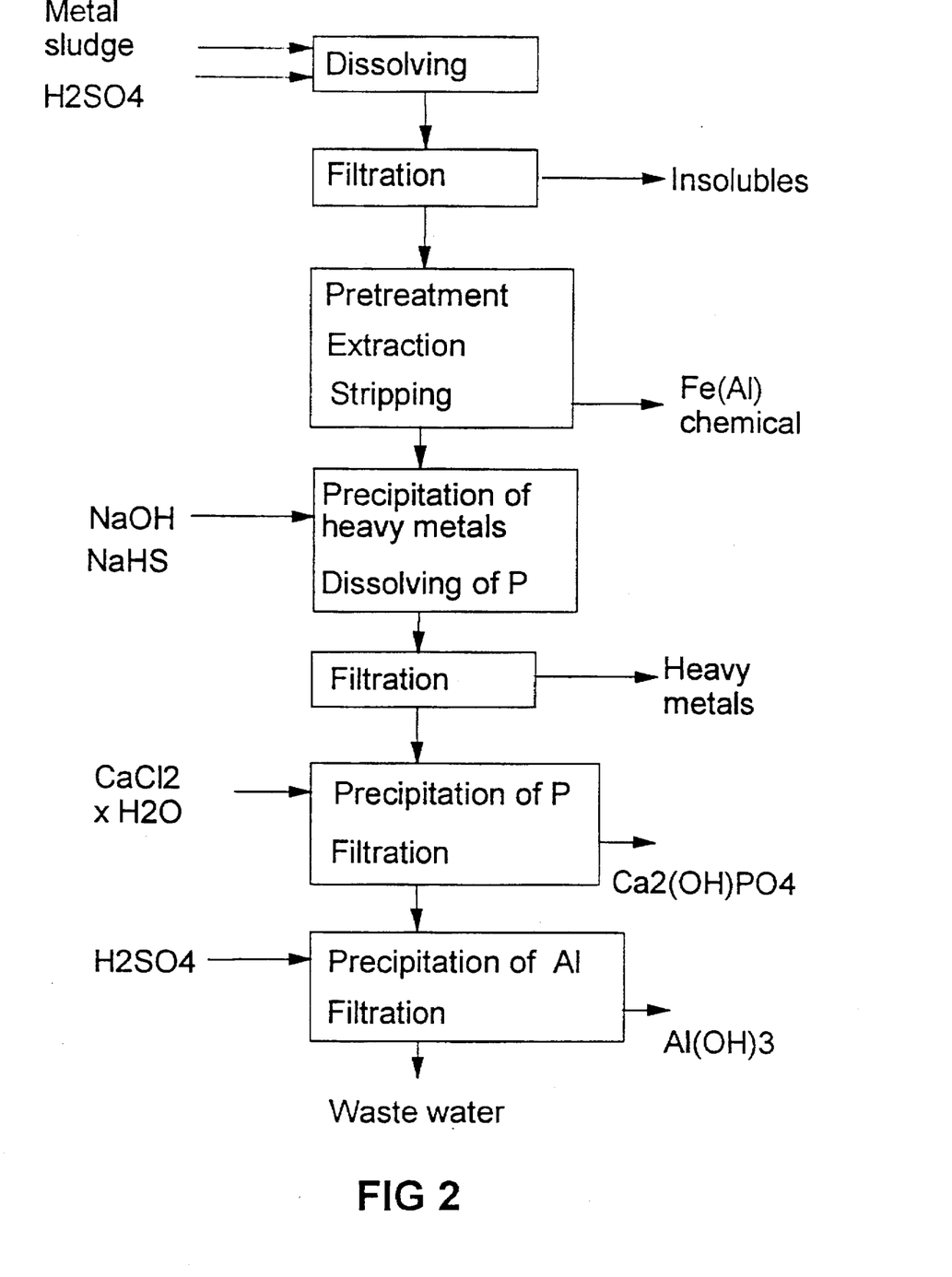
FIG. 2 shows a method according to the invention for treating a metal sludge obtained from a waste water sludge as a block diagram.

According to FIG. 2 the metal sludge is dissolved in sulphuric acid or possibly in hydrochloric acid in the dissolving stage and insoluble substances are separated by filtering in the filtration stage.

The solution obtained from the filtration (filtrate) is led to the extraction stage. For example, following contents have been analyzed from the acidic solution: Fe (max. 6%) both ferric and ferrous, aluminium (max. 1%), Ca (max. 1000 ppm), Mg (max. 100 ppm), Pb (max. 100 ppm), Cu, Ti, Cd, etc. The contents of metals in the solution may vary if Al has been used as the coagulant. The content varies also depending on what neutralizing base has been used in the precipitation of the original metal sludge. The extractant is a mixture of two or more organic compounds where the diluent for the effective agent like alkyl phosphate is a straight-chain hydrocarbon like kerosene and, if necessary, an additional compound like a long straight-chain alcohol for enhancing the phases disengagement. Before the extraction stage the solution can be treated with an oxidizing agent which oxidizes iron into $Fe^{3+}$ and oxidizes organic substances into such form that they do not hinder extraction. Strong $H_2O_2$ can be preferably used as the oxidizing agent. It is also possible that the oxidizing agent is added before the filtration stage.

In the extraction stage the acid solution is contacted with the above mentioned organic solution whereupon trivalent iron and partly also aluminium are transferred from the acid solution into the organic solution. Extraction is preferably performed at constant pH since extraction efficiency decreases with decreasing pH. pH can be adjusted by using alkali hydroxide or ammonia water, for example. After extraction, the organic phase and the aqueous phase are separated and the obtained extract solution containing the iron and aluminium is contacted with strong hydrochloric acid, for example, whereby trivalent iron and aluminium are transferred again to the acidic solution. This re-extraction or stripping can be also performed by using sulphuric acid whereby trivalent iron is reduced to divalent form which has less tendency to remain in the organic solution. The organic solvent, which is free of metals, can be recycled back to the process. The acidic solution obtained from the re-extraction i.e. the raffinate of stripping contains iron and aluminium and can be further used for production of coagulants. Generally, the mixer/settler apparatus contains several equilibrium stages with counter- or cross-flow of phases.

The acid solution (pH 0.5–1) obtained from the extraction stage or the raffinate of extraction contains mainly phosphorus but also some unextracted iron, aluminium and heavy metals. This raffinate must be purified from organic residues e.g. by using active carbon before any further treatment.

According to FIG. 2, sulphides like NaHS, $Na_2S$, FeS or $H_2S$ are added to the solution for precipitation of metals. Other known heavy metal binders can also be used. The pH of the solution is adjusted to the range of about 3–4 to enable precipitation. NaOH can be used for the pH adjustment, for example. Since each heavy metal precipitates at a specific pH, addition of sulphides is done simultaneously with raising of pH from 3–4 to 6–7 to allow precipitation of all the heavy metal components. The iron and aluminium which remain from the extraction stage precipitate as phosphates together with heavy metals which precipitate as sulphides, and/or hydroxides, and/or phosphates. After precipitation, pH is raised to over 9, preferably to about 12, by adding NaOH so that the only soluble components which remain in the solution are aluminium and phosphorus whereas other metals remain in insoluble form. In other words, the Al-phosphate which precipitated in the earlier stage dissolves as pH is raised.

In the filtration stage, which follows the precipitation of heavy metals, the precipitate is separated from the liquid phase containing then primarily phosphate and sodium aluminate. The last residue of iron are separated at this stage along with the precipitate.

In the phosphorus precipitation stage, $CaCl_2$ is added to the filtrated solution to precipitate phosphorus as calcium phosphate which is filtrated in the subsequent filtration stage. The remaining filtrate contains soluble aluminium which is precipitated as aluminiumhydroxide by lowering the pH of the solution to level 7–8 using $H_2SO_4$, for example.

Figure 3:
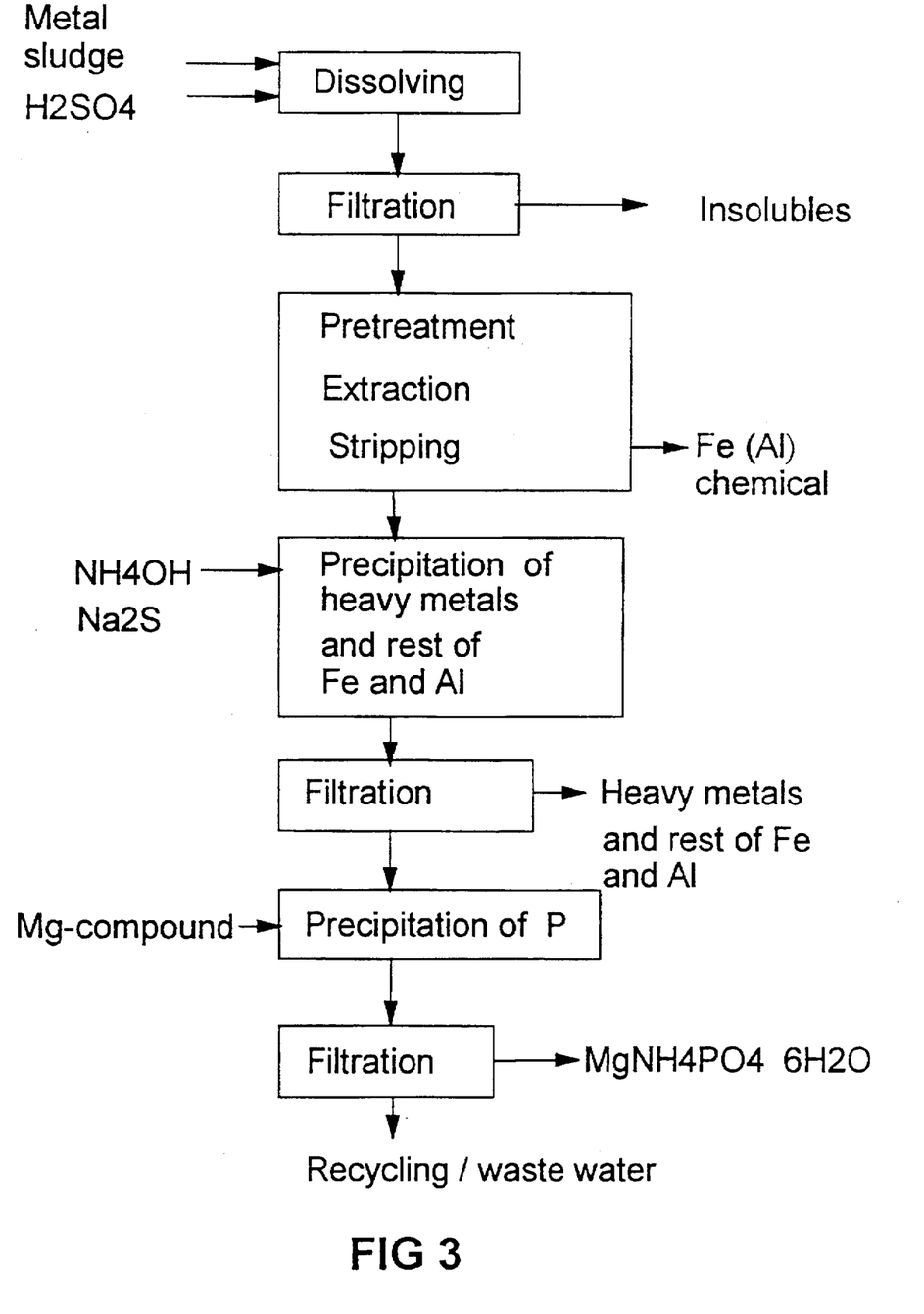
FIG. 3 shows a second treatment method according to the invention.

According to a second method, which is presented in FIG. 3, precipitation of heavy metals is performed at pH of about 5–8 using $Na_2S$ and $NH_4OH$ for the pH adjustment. Heavy metals and unextracted Fe and Al precipitate as sulphides and phosphates. The precipitate is separated after which Mg is added as $MgCl_2$, MgO or $Mg(OH)_2$ and pH is raised if necessary to level 8–9 using $NH_4OH$. Phosphorus in the solution precipitates as $MgNH_4PO_4$ which can be used as a raw material for fertilizers. The amount Mg and $NH_4$ chemicals mentioned above is proportioned so that they are in stoichiometric ratio with the amount of $PO_4$ to be precipitated. Preferably there is a small surplus of Mg.

According to another embodiment of the method of the invention heavy metal precipitation is performed at pH of about 4 using $Na_2S$ and $NH_4OH$ for the pH adjustment. Heavy metals precipitate as sulphides and/or hydroxides and/or phosphates. Next, MgO is added to the solution and pH is raised to 5–6 whereby aluminium and chromium precipitate as phosphate and/or hydroxide. The precipitate is separated whereafter MgO and $NH_4OH$ are further added to the solution so that pH is about 9 whereby phosphorus precipitates as $MgNH_4PO_4$.

A possible procedure is that first the heavy metals are precipitated at pH 4 in the above described way whereafter aluminium and chromium are precipitated at pH 5–6 and then filtration is performed.

After the extraction/stripping stage the raffinate solution always contains some Fe and Al (see Table 2 in Example 5) which bind an equal number of moles of phosphorus. For example, the amount of Fe given in Table 2 in Example 5 binds an excessive amount of P of the raffinate solution. Therefore, Fe and Al must be removed. If the pH of the solution is raised $FePO_4$ and $AlPO_4$ will precipitate and the phosphorus is lost. There are several different ways to handle the problem of remaining Fe and Al in the raffinate solution.

The first method is presented in FIG. 2. After the extraction/stripping stage, the remaining Fe and Al will be first precipitated as phosphates along with the heavy metals. Upon raising the pH with NaOH to about 12 $AlPO_4$ will be redissolved. Ferric phosphate, on the other hand, will convert to an insoluble ferric hydroxide, which is removed along with the heavy metal precipitate, and the $PO_4^{3-}$ of the ferric phosphate is dissolved.

The second method is presented in FIG. 3. In this case, the Fe and Al are precipitated together with the heavy metals as phosphates. Apart from losing the Fe and Al remaining in the raffinate solution, an equal mole number of P is also lost.

Figure 4:
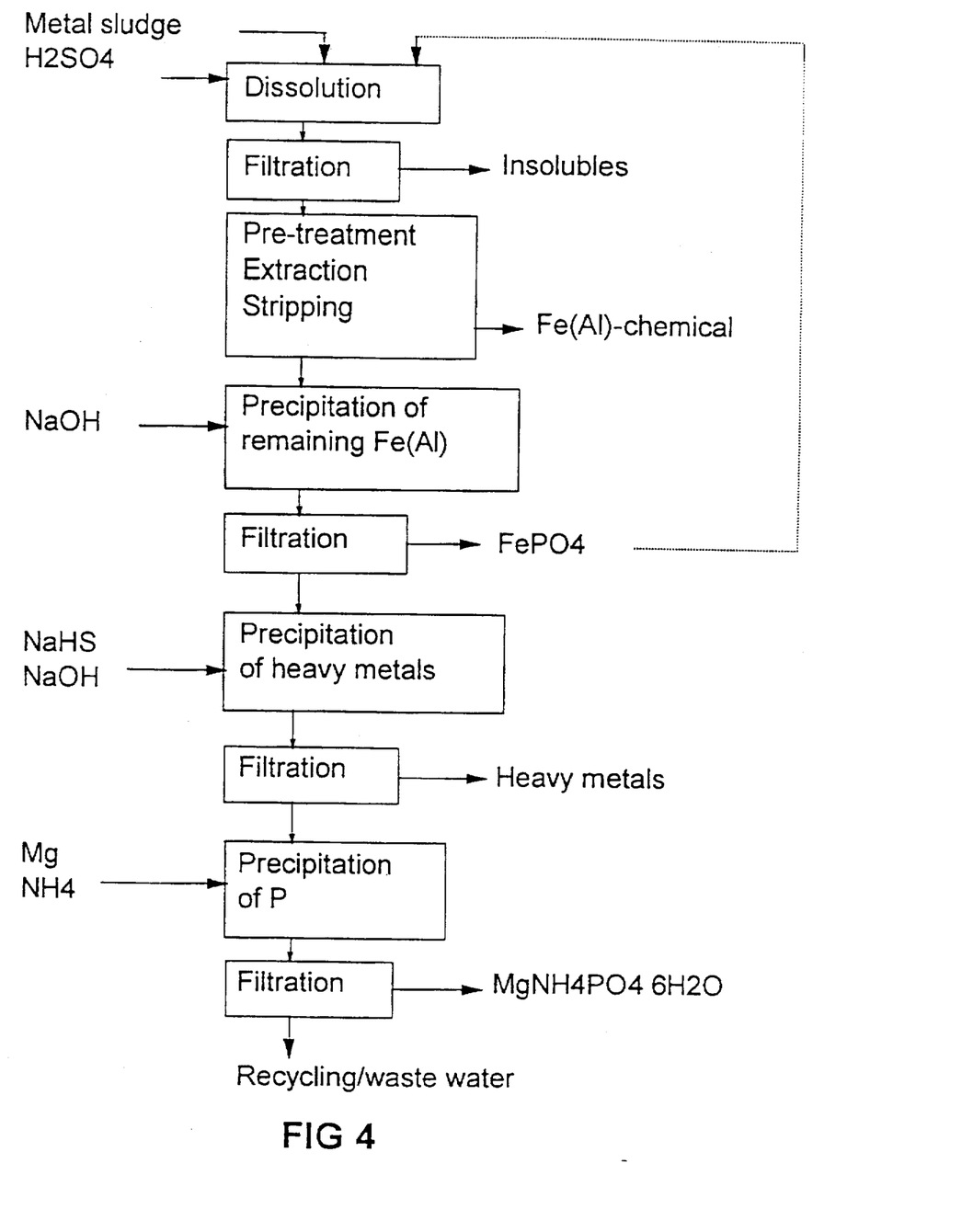
FIG. 4 shows a third treatment method according to the invention and FIG. 5 shows a fourth treatment method according to the invention.

A third method for handling the remaining Fe and Al is shown in FIG. 4. In this case, there is an extra precipitation stage after the extraction/stripping. The pH is raised to about 3 with NaOH. The pH can vary in the range 2–4. At this pH, ferric phosphate, $FePO_4$, and possibly $AlPO_4$ will precipitate at a good yield. The precipitate is then separated by filtration. The precipitate can be utilized as such or it can be returned to the dissolution stage. The filtrate solution, free of Fe and Al, is treated in the same way as in the process of FIG. 3. The drawback of this method, in the case the $FePO_4$ precipitate is returned to dissolution stage, is that the recycling leads to an increase in the P content of the extracting solution. This is not desired. It would be more desirable to return only the Fe of the $FePO_4$ back to the dissolution stage and lead the $PO_4$ of the $FePO_4$ forwards in the process.

Figure 5:
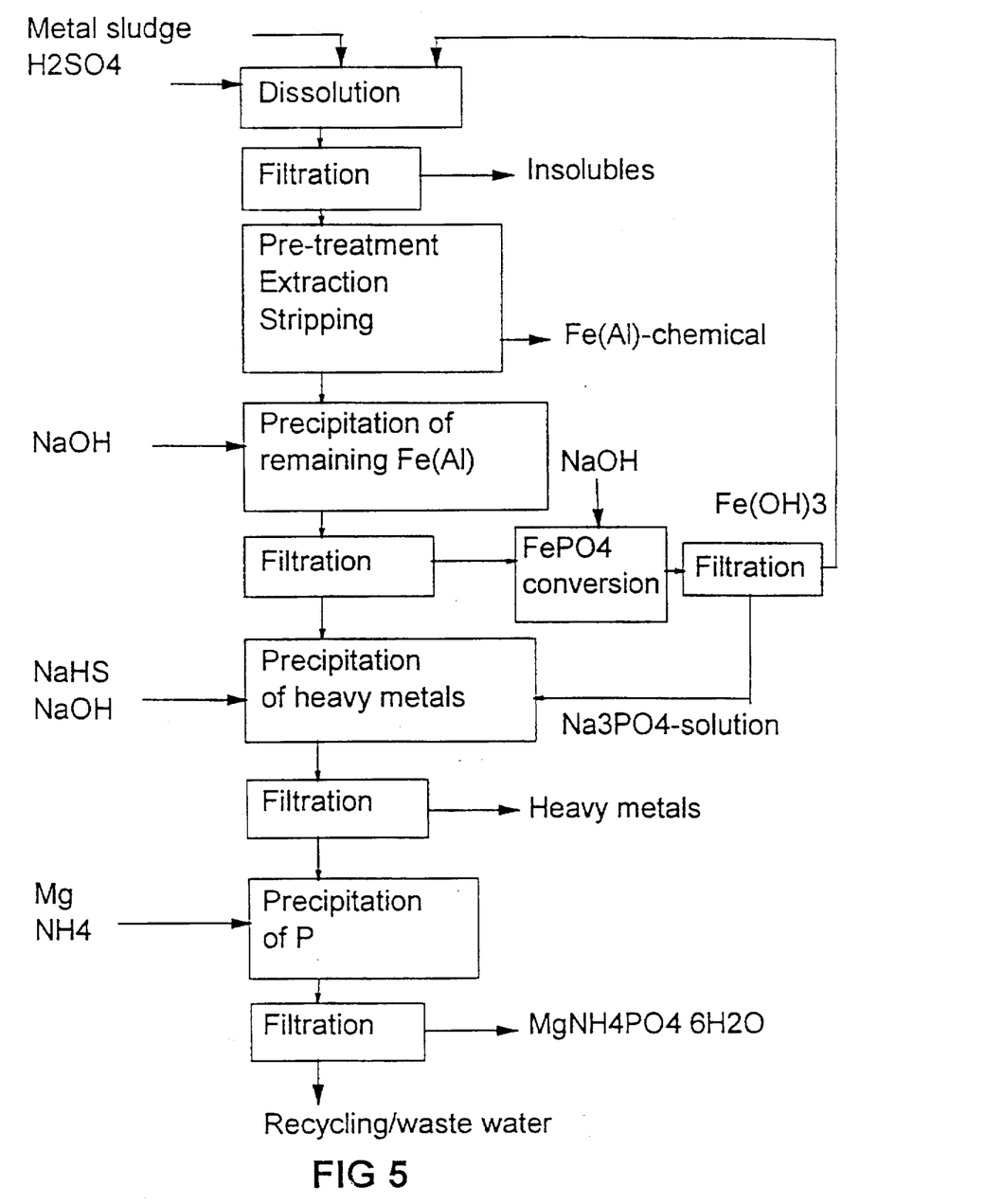

A fourth method is presented in FIG. 5. In this case the Fe and Al is precipitated as $FePO_4$ and $AlPO_4$ which are separated by filtration. Next, the phosphate precipitate is dissolved with NaOH with a slight warming (60° C.) of the solution. Ferric phosphate is dissolved and soluble sodium phosphate and insoluble $Fe(OH)_3$ is formed. Aluminium phosphate is totally dissolved. After separation, the ferric hydroxide precipitate is returned to the beginning of the process and the sodium phosphate solution, containing aluminium, is led to the subsequent process stage i.e. to the stage where heavy metals are precipitated or even to the stage of phosphate precipitation. Another possible process variant is such that the sodium phosphate is precipitated from the solution and is utilized as such as a detergent phosphate.

Instead of returning the ferric hydroxide precipitate to the beginning of the process there is another interesting possibility. The ferric hydroxide let to dry and then it is added into the raffinate of the stripping stage i.e. to the aqueous phase. The added ferric hydroxide contributes in two different ways: firstly it neutralizes the free acid of raffinate and secondly it raises the relatively low Fe-content of the raffinate solution.

It is worth noting in the process of FIG. 5 that the amount of NaOH used for dissolving the $FePO_4$ precipitate reduces the amount of NaOH needed at the precipitation of heavy metals. This means that no extra NaOH is needed in the process of FIG. 5 compared to the process of FIG. 4 or FIG. 3. Furthermore, there is no increase in the P content of the extraction solution because phosphorus bound to Fe is not returned to the beginning of the process but the soluble phosphorus is led forwards in the process.

The process of the invention has several alternative modes of operation. One interesting alternative, which greatly improves the recovery of nutrients i.e. phosphorus and ammonia of the waste water, is such that the metal sludge is formed by neutralizing the acidic hydrolysate with a Mg-compound. This has the effect that $MgNH_4PO_46H_2O$ (struvite) will precipitate into the metal sludge reducing the content of ammonia in the hydrolysate. If Mg-compounds and possibly ammonia are properly used in all pH adjustments of the process so that the number of moles of ammonia equals to the number of moles of phosphorus corresponding to the mole ratio in $MgNH_4PO_4$, then after the final precipitation of $MgNH_4PO_4$ no ammonia will be left and none of it has to be returned to the waste water process. Hence all nutrients have been recovered. If only Mg-compounds have been used in pH adjustments the remaining filtrate solution contains primarily $MgSO_4$, which can be separated by evaporation and obtain a product of commercial value.

In the following, the invention will be further explained by means of examples.

EXAMPLE

Example 1

A solution was obtained by leaching a metal containing waste water sludge with dilute $H_2SO_4$ and filtering for gypsum removal at approximately pH 1. The density of the solution was 1080 kg/m$^3$ and it contained 0.6% $Fe^{2+}$, 1.8% $Fe^{3+}$, 0.21% Al.

$H_2O_2$ (10 ml) was added to the above solution (120 ml) during 60 minutes in a stirred cell. During feeding $H_2O_2$ the temperature increased from 20° C. to 55° C. The solution was filtered once more through a fuller's earth filter, the bed thickness of which was 10 mm. The filtrate solution (60 ml) was contacted with an organic extraction solvent (180 ml) so that the phase ratio organic/aqueous=3/1. The organic solvent consisted of 22.5%MDEHPA, 67.5% kerosene and 10% 2-octanol. MDEHPA contained 45% MEHPA and 55% DEHPA. After 20 minutes of mixing the mixture was withdrawn to a separation funnel for phase separation. The organic phase was disengaged from the aqueous phase very rapidly, in 10–15 seconds. Virtually no crud was detected between the phases. The efficiency of the extraction is presented in Table 1a.

TABLE 1a

Relative amounts of metal components transferred from the aqueous phase to the extractant i.e. the efficiency of extraction (%)

| Component | Efficiency |
|---|---|
| Total Fe | 96.4% |
| Al | 21.3% |

25 ml of the organic extract loaded with Fe and Al was contacted with 6M HCl in a stirred cell for 20 minutes. Thereafter the phases were separated in a separation funnel. The disengagement was again rapid and following stripping efficiencies were obtained (Table 1b):

TABLE 1b

Relative amounts of metal components transferred from the extractant to the stripping solution i.e. the efficiency of stripping (%)

| Component | Efficiency |
|---|---|
| Total Fe | 52.9% |
| Al | 70.8% |

Example 2

A solution from the extraction stage (207 g) contained 0.12% Fe, 0.18% Al, 1.62% $PO_4$ and heavy metals: 0.0018% Cu, 0.0009% Cr, 0.0124% Zn. 60 g of NaOH-solution (20%) was added to the solution and the pH rose to 2.7. Then 27.6 g of $Na_2S$-solution (35%) was added whereby pH rose to 3.8. A precipitate was obtained which contained heavy metals as sulphides. The precipitate was filtered (2.5 g) and analyzed. A qualitative X-ray analysis showed that the precipitate contained following heavy metals: Cu, Pb, As, V, Cr, Sr, Ni.

Next, a 57.6 g amount of NaOH (20%) was added to the filtrate (260 g) containing soluble aluminium and phosphorus, among other things, whereupon pH rose to the value of 13. It is typical of aluminium that as pH rises, aluminium first precipitates but begins to redissolve again as pH rises above 8. The aim of raising pH was to redissolve the precipitated aluminium. In this stage, however, hydroxides precipitated from the solution. The precipitate was filtrated and $CaCl_2$-solution was added to the filtrate (285 g) and a calcium phosphate precipitate (31.8 g) was obtained which, according to X-ray diffraction, contained $Ca(OH)_2$ and $Ca_5(OH)(PO_4)_3$. The precipitate contained 88% of the phosphorus of the Starting solution i.e the solution obtained from the extraction. Aluminium was also precipitated so that the precipitate contained 45% of the aluminium of the starting solution. The mole ratio $[PO_4^{3-}]/[Al]$ was 5.0. In the last stage, $H_2SO_4$ (10%) was added to the filtrate so that pH sank to value 7. The purpose was to precipitate the aluminium remaining in the solution. However, no precipitation occurred because aluminium had already precipitated in the previous stages. The original sludge was obtained by an iron coagulant so that amount of aluminium was small.

Example 3

In this example $NH_4OH$ was used for pH adjustment. Precipitation of heavy metals was performed at pH 4.0 using $Na_2S$-solution. The heavy metal precipitate contained 4% of the original phosphorus and 4% of the original aluminium. Next, pH was raised to level 5.4. The precipitate contained 24% of the original phosphorus and 63% of the original aluminium. After precipitation, MgO and $NH_4OH$ were added to the solution and pH rose to 9.0. A $MgNH_4PO_4$-precipitate (struvite) was obtained with about 70% of the original phosphorus and about 30% of the original aluminium. The mole ratio $[PO_4^{3-}]/[Al]$ was 6.0.

Example 4

In this example the procedure with respect to pH was the same as in the previous example but now there was no filtration after the heavy metal precipitation stage. Instead, the pH was raised to level 5.4 after the heavy metal precipitation. At this pH precipitation of phosphates took place. The precipitate contained 23% of the original phosphorus and 62% of the original aluminium. Adjustment of pH of the solution was performed using $NH_4OH$. In this test the yield of phosphorus was of the same order of magnitude as in example 3.

Example 5

The raffinate from the extraction/stripping stage had the analysis of Table 2.

TABLE 2

Analysis of the raffinate.

| Element | Concentration |
|---|---|
| Fe | 0.16% |
| $Fe^{2+}$ | 0.11% |
| Al | 0.12% |
| P | 0.42% |
| Cu | 6.9 ppm |
| Cr | 5.6 ppm |
| Zn | 7.3 ppm |

In order to further reduce the content of Fe in the raffinate, an extra precipitation i.e. a polishing precipitation was performed in the following way. The amount of the above raffinate used in the precipitation was 817.5 g (750 ml) with a pH of 0.86. A 159.1 g amount of NaOH (30% was used to raise the pH of the raffinate solution to 2.8. After raising pH, a 1.5 g amount of $H_2O_2$ was added to make sure that all Fe was in trivalent form. The solution was then stirred for 1 h. A light brown precipitate, identified as FePO$_4$ by X-ray methods, was obtained. The solution was filtrated to separate the precipitate. The amount the dry precipitate was 10.3 g. The precipitate was washed with 83.9 g of distilled water. This washing water was added to the filtrate and the total amount of filtrate including the water was 984.6 g. The analysis of the filtrate obtained is given in Table 3.

TABLE 3

Analysis of the raffinate after removal of Fe by a polishing precipitation and the relative reduction of the elements.

| Element | Concentration | Reduction-% |
|---|---|---|
| Fe | 0.005% | 96.2 |
| Al | 0.049% | 50.8 |
| P | 0.05% | 85.7 |
| TOC | 0.04% | — |
| Cd | <0.3 ppm | — |
| Cu | 4.9 ppm | 14.5 |
| Cr | 3.8 ppm | 18.3 |
| Ni | 4.5 ppm | — |
| Pb | <5 ppm | — |
| Zn | 57 ppm | 6 |

Results of this experiment indicate clearly that iron can be removed effectively by an extra precipitation step. The obtained precipitate can be either utilized as such as an additive in a fertilizer or it can be returned to the beginning of the process i.e. to the dissolution stage. If it is returned to the dissolution stage, the phosphorus content of the process solution will gradually rise to an equilibrium value which is the same the value given in Table 2.

Example 6

A 15 g amount of dried FePO$_4$-cake (12% P, 24% Fe) precipitated from a raffinate solution was dissolved into 56 g of water and 26 g of NaOH (50%). The pH was adjusted to 12 and the reaction vessel was slightly warmed so that the temperature was 50° C. After 2 hours the precipitate was filtrated and the precipitate was washed with water. The amount of Fe(OH)$_3$ precipitate obtained was 7.2 g (dry weight) containing 50% Fe and 2.2% P. This result indicates that an almost complete conversion of FePO$_4$ to Fe(OH)$_3$ has taken place in terms of the iron content. Therefore, all Fe of the raffinate can be removed and returned to the beginning of the process. The filtrate contained less than 0.002% Fe. The yield of P in the filtrate was more than 90%. This portion of the P can be separated to be led to the following process stage.

Example 7

A raffinate solution after separation of FePO$_4$ and returning of P had the analysis of Table 4 (column A). To precipitate heavy metals from this solution, NaHS and NaOH were added. The precipitate was filtrated and washed with water. The filtrate solution was analyzed for the heavy metals and the results are given in Table 5 (column A). Since the concentrations of the original raffinate were so low, below the detection limit of the elements, these results were not very reliable in showing the efficiency of sulphide precipitation in removing the heavy metals. Therefore, another test was made with the same raffinate but with added heavy metals. The heavy metal concentrations of the raffinate, after the addition, are given in Table 4 (column B).

TABLE 4

Analysis of the raffinate after removal of Fe and return of P. A = original raffinate, B = after addition of heavy metals.

| Element | Concentration A | Concentration B |
|---|---|---|
| Fe | 0.005% | |
| Al | 0.049% | |
| P | 0.39% | |
| TOC | 0.04% | |
| Cd | <0.3 ppm | 20 ppm |
| Cu | 4.9 ppm | 24.9 ppm |
| Cr | 3.8 ppm | 23.8 ppm |
| Ni | 4.5 ppm | 24.5 ppm |
| Pb | <5 ppm | 25 ppm |
| Zn | 57 ppm | 117 ppm |

To an amount of 220.6 g of the above solution, 370 mg NaHS (40%) and 9.0 g NaOH (30%) were added to precipitate heavy metals as sulphides. The pH rose to 8.5. The precipitates were filtrated and washed with 51.2 g of water. The dry weight of the heavy metal cake was 1.725 g. The amount of filtrate solution (including the wash water) 261 g. The heavy metal concentrations of the filtrate and the corresponding reduction percentages are given in Table 5 (column B).

TABLE 5

Analysis of the raffinate solution after precipitation of heavy metals, the right column gives the relative reduction of the concentration of the elements.

| Element | Concentration A | Concentration B | Reduction B |
|---|---|---|---|
| P | 0.27% | — | — |
| Mg | 0.036% | — | — |
| NH4 | 0.04% | — | — |
| Al | <0.004% | — | — |
| Cd | <0.3 ppm | <1.2 ppm | >94% |
| Cu | <2 ppm | <2.4 ppm | >90% |
| Cr | <3 ppm | <3.6 ppm | >85% |
| Ni | <2 ppm | <2.6 ppm | >91% |
| Pb | <5 ppm | <5 ppm | >76% |
| Zn | 0.3 ppm | 0.38 | >99% |

Results of Table 5 shows that heavy metals can be effectively removed from the raffinate solution by sulphide precipitation. There is some loss in phosphorus. This is partly due to aluminium which binds phosphorus at this pH and partly formation of magnesium phosphate.

Example 8

Table 6 presents results from tests for precipitating heavy metals at various pH. The differences in the results are small. If pH goes over 6 there is a danger that MgNH$_4$PO$_4$ starts to precipitate leading to phosphorus losses in the raffinate.

TABLE 6

Analysis of the original raffinate solution before precipitation of heavy metals and after precipitation at various pH.

| Element | Original | Filtrate after precipitation | | |
|---|---|---|---|---|
| | | pH 5.1 | pH 6.0 | pH 6.6 |
| Cr (ppm) | 4.2 | <2 | <2 | <2 |
| Ni (ppm) | 5.4 | 2.4 | <2 | <2 |
| Zn (ppm) | 60 | <0.3 | <0.3 | <0.3 |
| P (%) | — | 0.35 | 0.36 | 0.34 |

Example 9

To an amount of 250 g of the filtrate solution from example 7, 5.32 g of $MgCl_2$ and 4 g of $NH_3$-solution (25%) were added to precipitate P as $MgNH_4PO_4$. The pH was adjusted to 9. The solution was filtrated yielding a cake with a dry weight of 3.55 g. The cake was analyzed by XRD and was identified as $MgNH_4PO_4 \cdot 6H_2O$ (struvite). The cake was dried to a dry weight of 3.55 g and analyzed. The dried cake contained 14% Mg, 4.5% $NH_4$, and 20.8% P. The crystal water and half of the ammonia had evaporated during drying due to a too high temperature. The yield of P in this precipitation was 96.3%. The filtrate solution (246.5 g) contained <0.01% P.

Example 10

A 118 g amount of the filtrate, from which heavy metals had been removed by sulphide precipitation and which contained 0.23% P, was taken and pH was adjusted from 8.0 to 6.0 with 96% $H_2SO_4$. A 1.93 g amount of $CaCl_2 \cdot 2H_2O$ was then added and the batch was mixed for 2 hours, the temperature being about 50° C. The pH of the batch was then raised from 5.3 to 8.5 by adding 0.63 g $Ca(OH)_2$. After mixing for 2 h, the batch was filtrated yielding a cake with a dry weight of 2.55 g and a 106.5 amount of filtrate. The cake was analyzed by XRD and was identified as $Ca_3(OH)(PO_4)_3$. It contained 12% P and 29% Ca. The filtrate contained <0.01% P.

Example 11

A metal sludge with DS of 29.6% was calcined at 325° C. for 1 h. The ignition loss was 26.8%. The calcinate containing 17% Fe, 3.2% P, 5.5% Al was then dissolved in sulphuric acid (96%) for 2 h at a temperature of over 100° C. The solution was filtrated and the filtrate contained 4.6% Fe, 0.38% Al, 0.86% P, and 0.05% TOC. In the extraction stage there was no crud formation and the extraction rate was high. Extraction efficiency was of the same order as in parallel extraction tests with the hydrogen peroxide pretreatment without any calcination.

The invention is not limited to the above examples but can be varied within the limits of the enclosed claims. Therefore, dissolution of metals from waste water sludge can be performed without thermal treatment. Thermal treatment is advantageous since it improves filterability of the organic sludge and solvability of metals. It is essential for the implementation of the method of the invention that the metals in the waste water sludge are first dissolved through acidification and then precipitated as phosphates and hydroxides.

We claim:

1. A method for treating a waste water sludge, the sludge comprising phosphorous, heavy metals and at least one metal originating from a waste water treatment coagulant, in order to recover the phosphorous and the at least one metal, and to discharge the heavy metals, wherein the at least one metal comprises iron or both iron and aluminum, the method comprising:

acidifying the sludge to dissolve metals contained therein;

subjecting the acidified sludge to liquid-liquid extraction to thereby provide an aqueous phase or raffinate, and recovering at least a portion of the at least one metal;

treating the raffinate, during a first precipitation stage, with an effective amount of chemicals to provide a precipitate comprising heavy metals, and a solution having a decreased content of heavy metals;

discharging the precipitate comprising heavy metals;

treating the solution having a decreased content of heavy metals, in a second precipitation stage, with an effective amount of chemicals to provide a precipitate comprising phosphorous; and recovering phosphorous from the precipitate comprising phosphorous.

2. The method of claim 1 further comprising treating the sludge, after the acidifying and prior to the liquid-liquid extraction, with an oxidizer in order to convert organic material contained in the sludge into a form that does not have an unfavorable effect on the liquid-liquid extraction, and to oxidize divalent iron contained in the sludge into trivalent iron.

3. The method of claim 2 wherein the oxidizer is hydrogen peroxide.

4. The method of claim 1 further comprising calcination of the sludge, after the acidifying, in order to incinerate organic material contained therein.

5. The method of claim 1 wherein the liquid-liquid extraction comprises an extraction stage and a stripping stage; the method further comprising contacting the sludge, during the extraction stage, with a water-immiscible extraction solution to thereby form both a first aqueous phase or the raffinate, and a first organic phase, wherein the first organic phase is loaded with ions of the at least one metal;

separating the raffinate from the first organic phase;

contacting the first organic phase, during the stripping stage, with an acidic aqueous stripping solution to thereby form both a second organic phase and a second aqueous phase, wherein the second aqueous phase is loaded with ions of the at least one metal; and separating the second organic phase from the second aqueous phase.

6. The method of claim 5 wherein the extraction solution comprises an organic phosphate and an organic solvent.

7. The method of claim 6 wherein the organic phosphate is an alkyl phosphate selected from the group consisting of monoalkyl phosphate, dialkyl phosphate, trialkyl phosphate and mixtures thereof.

8. The method of claim 7 wherein the alkyl phosphate is selected from the group consisting of mono(2-ethylhexyl) phosphate, di(2-ethyl)phosphate, and tributyl phosphate.

9. The method of claim 6 wherein the organic solvent comprises a long-chained hydrocarbon.

10. The method of claim 9 wherein the long-chained hydrocarbon comprises kerosene.

11. The method of claim 6 wherein the organic solvent comprises a long-chained alcohol.

12. The method of claim 11 wherein the long-chained alcohol is 2-octanol.

13. The method of claim 1 further comprising,
    treating the raffinate, prior to the first precipitation stage, with an alkali hydroxide to thereby provide a precipitate comprising iron phosphate;
    separating the precipitate comprising iron phosphate.

14. The method of claim 13 wherein the precipitate comprising iron phosphate further comprises aluminum phosphate.

15. The method of claim 13 wherein the alkali hydroxide is added in an amount effective to raise the pH of the raftmate to a value between 2 and 4, and the alkali hydroxide is sodium hydroxide.

16. The method of claim 13 wherein the precipitate comprising iron phosphate is treated with an alkali hydroxide to thereby form insoluble iron hydroxide and a solution comprising soluble alkali phosphate.

17. The method of claim 16 wherein aluminum hydroxide is formed.

18. The method of claim 16 wherein the solution comprising alkali phosphate is introduced into the first or second precipitation stages.

19. The method of claim 1 or 13 further comprising,
    treating the raffinate, in the first precipitation stage, with a heavy metal binder at a pH effective to provide the precipitate comprising heavy metals;
    separating the precipitate comprising heavy metals; and
    treating, in the second precipitation stage, the solution having a decreased content of heavy metals with a phosphorous-precipitating reagent at a pH effective to precipitate phosphorous in a form comprising phosphate.

20. The method of claim 19 wherein the heavy metal binder is a sulfide selected from the group consisting of hydrogen sulfide, sodium sulfide, sodium hydrogen sulfide and ferrous sulfide.

21. The method of claim 19 wherein the pH effective to provide the precipitate comprising heavy metals is also effective to provide a precipitate comprising iron.

22. The method of claim 19 wherein the pH effective to provide the precipitate comprising heavy metals is also effective to provide a precipitate comprising aluminum.

23. The method of claim 19 wherein the phosphorous-precipitating reagent is selected from the group consisting of calcium oxide, calcium hydroxide, magnesium oxide, magnesium hydroxide and magnesium chloride.

24. The method of claim 19 wherein the solution having a decreased content of heavy metals is treated to provide a precipitate comprising calcium phosphate or magnesium phosphate.

25. The method of claim 19 further comprising
    treating the raffinate, in the first precipitation stage, with sodium sulfide, and adjusting the pH of the raffinate to a value between 5 and 8, to provide a first precipitate comprising heavy metals and an aqueous solution;
    separating the first precipitate;
    treating the aqueous solution, in the second precipitation stage, with a calcium or magnesium compound to provide a second precipitate; and
    separating the second precipitate.

26. The method of claim 25 wherein the pH of the raffinate is adjusted to a value between 5 and 8 with a base selected from the group consisting of sodium hydroxide, magnesium oxide, magnesium hydroxide and ammonia.

27. The method of claim 25 wherein iron is precipitated in the first precipitation stage.

28. The method of claim 25 wherein aluminum is precipitated in the first precipitation stage.

29. The method of claim 25 wherein the calcium or magnesium compound of the second precipitation stage is selected from the group consisting of calcium chloride, magnesium oxide, magnesium hydroxide and magnesium chloride.

30. The method of claim 25 wherein, in the second precipitation stage, the pH of the obtained aqueous solution is adjusted to provide for precipitation of a phosphate selected from magnesium phosphate and calcium phosphate.

31. The method of claim 19 further comprising,
    simultaneously treating the raffinate, in the first precipitation stage, with a sulfide selected from the group consisting of hydrogen sulfide, sodium sulfide, sodium hydrogen sulfide and ferrous sulfide, and a base sufficient to raise the pH of the raffinate to between 6 and 7;
    combining the simultaneously treated raffinate with additional base to raise the pH to greater than 9 and re-dissolve aluminum precipitates, if present;
    separating first precipitate containing heavy metals and obtaining an aqueous solution comprising phosphorous and aluminum;
    treating the aqueous solution comprising phosphorous and aluminum, in the second precipitation stage, with calcium chloride to provide a precipitate comprising calcium phosphate and an aqueous solution comprising aluminum;
    separating the precipitate comprising calcium phosphate;
    treating the aqueous solution comprising aluminum, in a third precipitation stage, with an acidic compound to provide a precipitate comprising aluminum hydroxide; and
    separating the precipitate comprising aluminum hydroxide.

32. The method of claim 31 wherein the acidic compound is sulfuric acid.

33. The method of claim 31 wherein the additional base raises the pH to about 12.

34. The method of claim 31 wherein the base sufficient to raise the pH of the raftmate to between 6 and 7 is sodium hydroxide.

35. The method of claim 19 further comprising,
    treating the raffinate, in the first precipitation stage, with sodium sulfide and adjusting the pH to a value of between 3 and 4 using sodium hydroxide, to provide a first precipitate comprising heavy metals and an obtained aqueous solution;
    separating the first precipitate;
    adjusting the pH of the obtained aqueous solution to a value of about 12 or greater using sodium hydroxide, to provide a second precipitate and an aqueous solution comprising aluminum and phosphorous;
    separating the second precipitate;
    treating the aqueous solution comprising aluminum and phosphorous, in the second precipitation stage, with calcium chloride, to provide a third precipitate comprising calcium phosphate and an aqueous solution comprising aluminum;
    separating the third precipitate;
    treating the aqueous solution comprising aluminum, in a third precipitation stage, with an acidic compound, to provide a fourth precipitate comprising aluminum hydroxide; and separating the fourth precipitate.

36. The method of claim 1 further comprising a third precipitation stage wherein aluminum is precipitated as aluminum hydroxide.

37. The method of claim 1 wherein the sludge comprises metal sludge obtained by subjecting waste water sludge from a waste water treatment plant to acid treatment followed by precipitation of the metal sludge from a filtrate.

\* \* \* \* \*